United States Patent [19]
Martin

[11] Patent Number: 5,473,844
[45] Date of Patent: Dec. 12, 1995

[54] CELL FOR REPAIRING VEHICLE BODYWORK

[75] Inventor: Guy Martin, Magnac-sur-Touvre, France

[73] Assignee: Omia, Saint-Yrieix, France

[21] Appl. No.: 285,060

[22] Filed: Aug. 2, 1994

[30] Foreign Application Priority Data

Aug. 5, 1993 [FR] France .................. 93 09678

[51] Int. Cl.⁶ .................................. E04H 5/00
[52] U.S. Cl. .................. 52/79.1; 52/174; 49/477.1; 454/52; 118/326
[58] Field of Search ............... 52/174, 79.1; 454/52; 49/477.1

[56] References Cited

U.S. PATENT DOCUMENTS

| | | | |
|---|---|---|---|
| 3,745,707 | 7/1973 | Herr | 49/477.1 |
| 4,173,924 | 11/1979 | Bradshaw | 454/52 |
| 4,505,483 | 3/1985 | Bent, Jr. | 49/477.1 |
| 4,616,594 | 10/1986 | Itho | 454/52 |
| 4,664,061 | 5/1987 | Morioka et al. | 454/52 |
| 5,042,420 | 8/1991 | Gerdes | 454/52 |

FOREIGN PATENT DOCUMENTS

| | | | |
|---|---|---|---|
| 3600786A | 7/1987 | Germany | 52/79.1 |
| 2218143A | 8/1989 | United Kingdom . | |

Primary Examiner—Carl D. Friedman
Assistant Examiner—W. Glenn Edwards
Attorney, Agent, or Firm—Pollock, Vande Sande & Priddy

[57] ABSTRACT

Cell for repairing a portion of a vehicle, including a plurality of modular panels, forming ceiling, cladding, floor, wherein the panels are secured together so as to make up a volume encompassing, on the one hand, all or some of the vehicle and, on the other hand, all of the means necessary for repairing the said vehicle, the said volume being equipped on one of its sides with at least one opening for the introduction of the said vehicle, the said opening being provided over all or some of its periphery with a sealing member allowing the said cell to be used in a configuration in which the volume and energy required are reduced.

6 Claims, 2 Drawing Sheets

CELL FOR REPAIRING VEHICLE BODYWORK

The present invention relates to the car industry in general and also to car repairs. It is more particularly concerned with a set of equipment for carrying out partial repairs in the field of car bodywork. Indeed, the type of repair in this field of activity has evolved greatly over the past few years.

Thus, impacts are, in the main, impacts in town which, in 80% of cases, affects the front or rear parts of the vehicle, while side impacts represent approximately 20% of the total. A person skilled in the art often proceeds with replacing parts (wing, hood, door, tailgate, trunk); these replacement operations are increasingly quick and require novel equipment in order to allow:

removal of the elements, slight straightening and shaping or replacement the part, an undercoat of primer, application of high-build primer, masking-off and rubbing-down of the parts, a base coat of paint, a clear coat, removal of masking and refitting of accessories.

Government regulations impose very strict conditions of protection for the workers operating in a toxic environment and particularly in the case of cells containing paints, atomized solvents, or fine solid particles in suspension.

Known cells, especially painting booths, generally encompass all of the vehicle and take up a substantial amount of floor space, commonly reaching some thirty square meters, without including the space which is to be set aside for all the machinery necessary for implementing the touch-up operations within the cell. Moreover, the electrical power output for delivering flow rates which are to be blown into the cell receiving the vehicle as well as to heat the working volume is substantial if one considers the portion of surface area of the vehicle which is undergoing the repair operations. Indeed, it is currently mandatory to place the whole vehicle in the ventilated cell, it being understood that the environment is thus protected, through isolation, from paint spray.

The present invention aims to overcome these drawbacks: wasted floor space, excessive energy consumption, by proposing a protection cell which encompasses just some of the vehicle when operations of touching up the bodywork are being undertaken.

According to the invention, this assembly exhibits dimensions which are practically half those of existing cells, and the same applies to the gaseous flow rates circulated through the volume, which gives rise to a very substantial decrease in the consumption of energy.

Of course, this assembly incorporates all the specialized apparatus, laid out ergonomically around the vehicle in order to optimize the task of the worker.

To this end, the cell for repairing a portion of a vehicle, including a plurality of modular panels, forming ceiling, cladding, floor, is characterized in that the panels are secured together so as to make up a volume encompassing, on the one hand, all or some of the vehicle and, on the other hand, all of the means necessary for repairing the said vehicle, the said volume being equipped on one of its sides with at least one opening for the introduction of the said vehicle, the said opening being provided over all or some of its periphery with a sealing member allowing the said cell to be used in a configuration in which the volume and energy required are reduced.

Other characteristics and advantages of the present invention will emerge from the description given hereafter, with reference to the appended drawings which illustrate one embodiment thereof, devoid of any limiting nature. In the figures.

Figure 1:
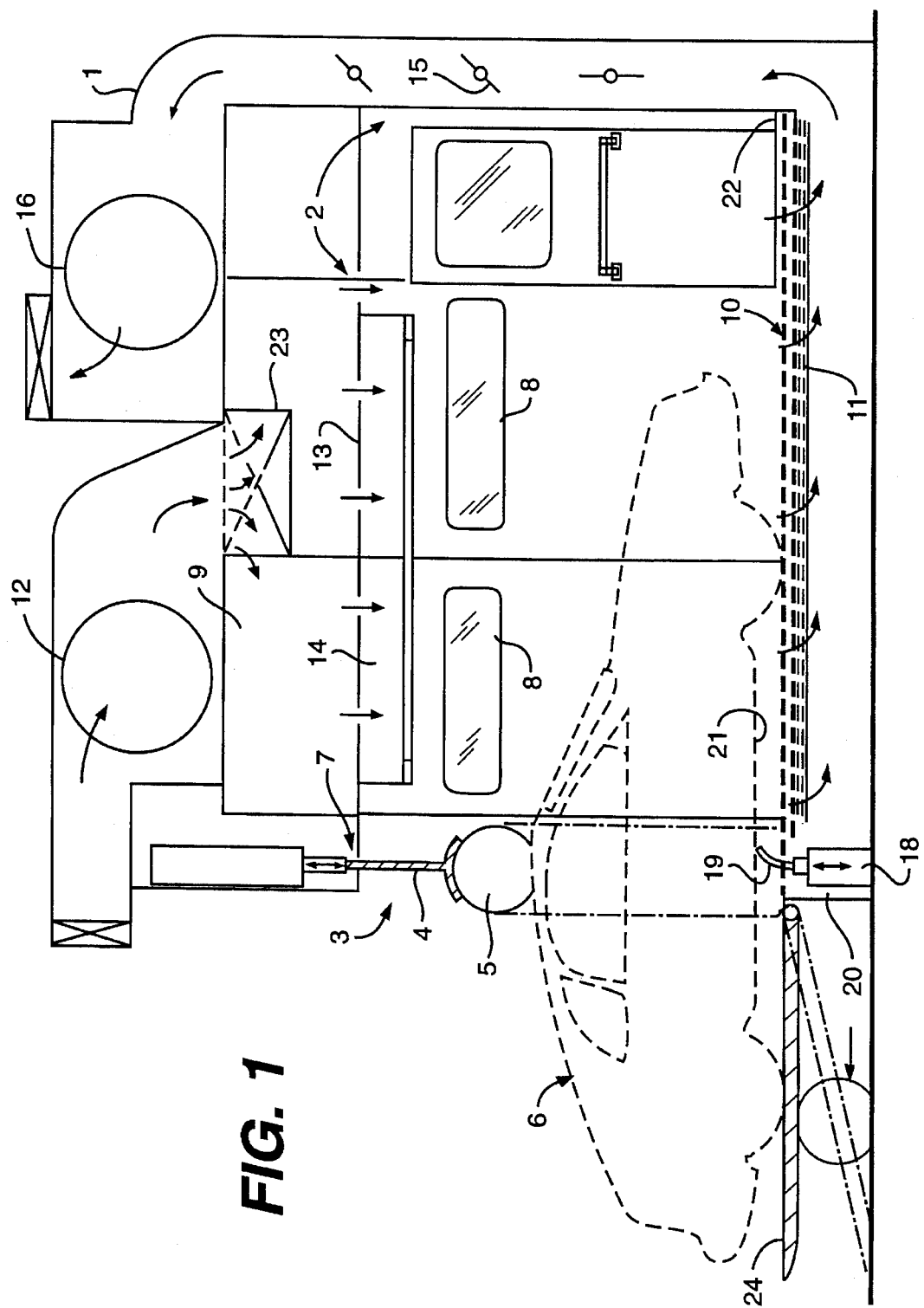
FIG. 1 is a planar sectional view in side elevation of a cell according to the invention.
Figure 2:
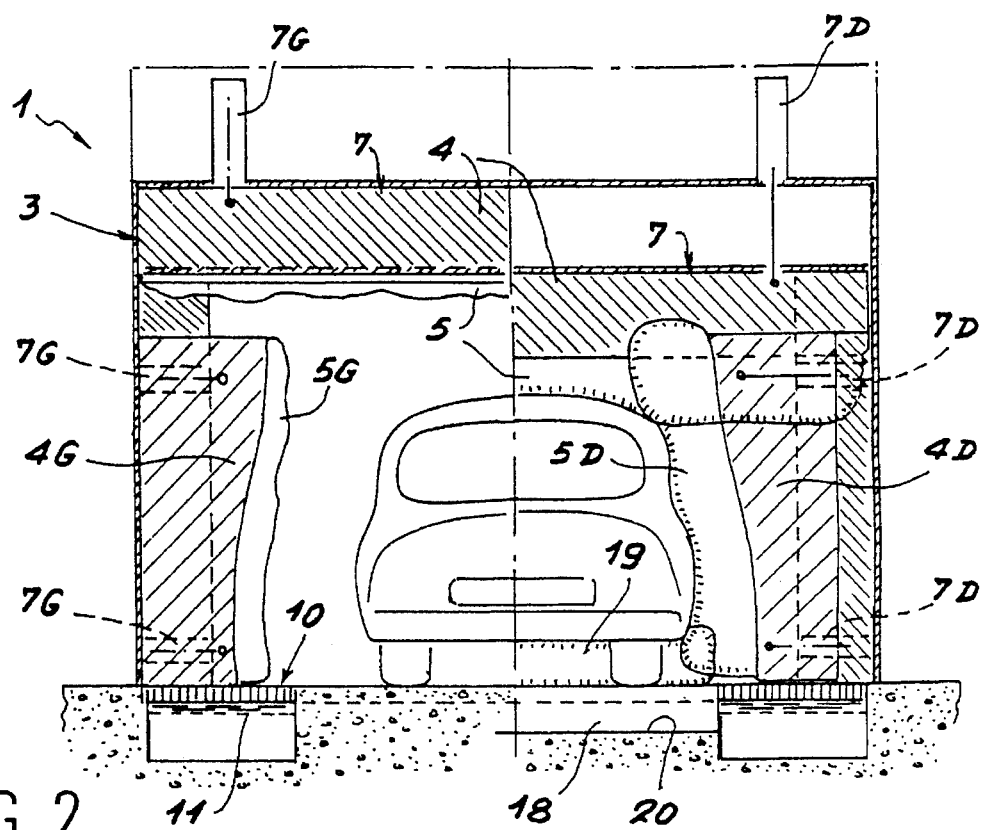
FIG. 2 is a planar sectional view, in front elevation, of a cell according to the invention, with civil engineering works.
Figure 3:
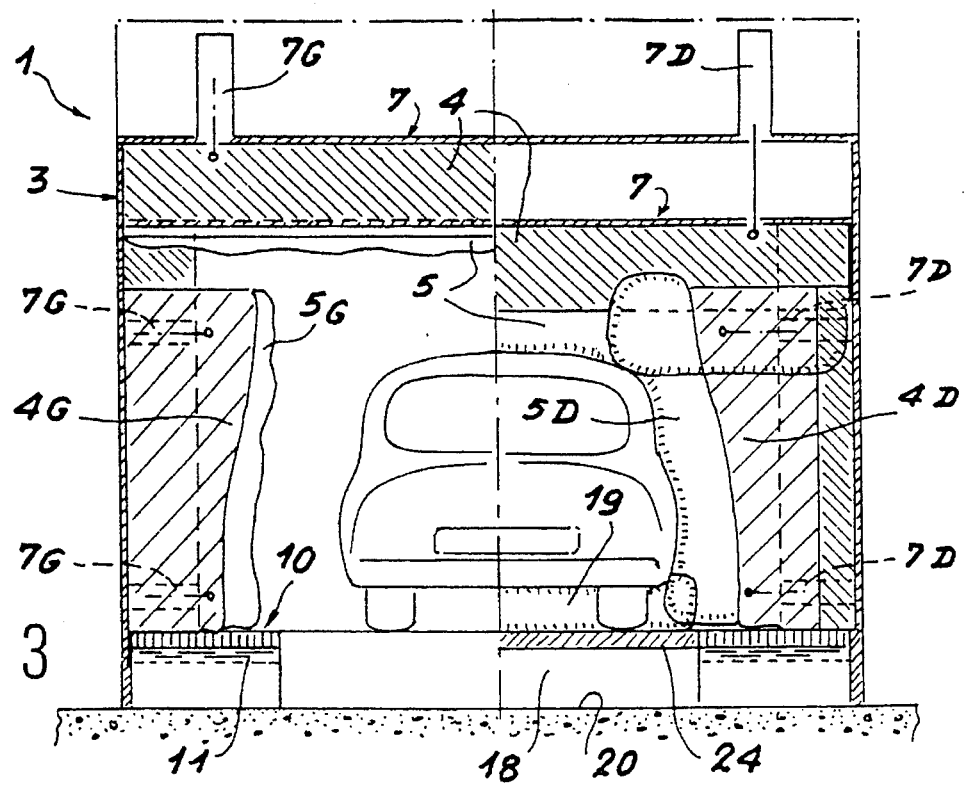
FIG. 3 is a planar sectional view, in front elevation, according to the invention, not including any civil engineering works but including a levelling chassis.

According to a preferred embodiment of a cell 1 for partial repair of bodywork of a vehicle, it is formed of a plurality of modular panels 2, particularly joined together by a system of bolts so as to make up a working volume, which in particular can be inscribed within a square. The cell 1 on one of its sides has an opening 3 in order to allow the introduction of the vehicle, this opening 3 also comprises, over all or some of its periphery, a sealing device 4, particularly in the shape of a U and made of several parts 4G, 4D, so as to comply with the legal requirements. This sealing device 4, 4G, 4D, especially produced in the form of an inflatable seal 5, 5G, 5D, gives an open section similar to the cross-section of the car 6. This design makes it possible to match the shape and contours of the vehicle, and of course the material of which the seal is made does not harm or damage the surface of the vehicle placed opposite it.

The sealing device 4, 4G, 4D is mounted on retractable panels 7, 7G, 7D actuated by any known means such as pneumatic or hydraulic rams and interacting with the periphery of the said opening 3.

Provision is also made for laying out direct or indirect, artificial or natural lighting means 8 (access hatches, safety doors) on the panels 2 making up the cladding of the cell, or the ceiling for preference, the air-filtration systems 9 are laid out in the ceiling, whereas solid particle filters are spread out in baskets 11 at ground level, the ground being produced in the form of a grating 10.

The air taken up outside the cell by an array of fans 12 is blown into the working volume through at least one intake 13, if necessary, it proceeds through a distribution chamber 14 providing mechanical prefiltration. The gaseous flow is distilled through a filtration system between the chamber 14 and the cell 1 and is taken back up at the bottom part of the cell 1 after it has flowed vertically downstream of the baskets 11 containing the solid particle filters.

The air, devoid of pollution, is then discharged to the outside by means of ducting provided with at least one adjustment member 15, particularly produced in the form of an adjustable restrictor so that the outlet speed of the fluid can be limited. An array of extraction fans 16 similar to those forming the array of blowing fans are also laid out on the air outlet network.

The extraction or blowing fan system is designed so as to cover the ranges of air flow rate which are used in the painting or drying phase, and regardless of the type of paint deposited (solvent-based or water-based paint).

According to another characteristic of the invention, provision is made for laying the cell 1 out on the ground or on an underframe. In the first embodiment, underground civil engineering works are undertaken in order to lay out air-extraction ducting, allowing the air to be recovered in a trench under the gratings 10 and the baskets 11 equipped with filters. This cell 1 is possibly provided with an elevator platform, so that the user can work ergonomically.

In the second embodiment, the cell is equipped with a chassis, particularly a metal one, possibly provided with an access ramp 24 allowing the vehicle to be placed horizontally after the ramp has been raised.

Regardless of the embodiment, the cell includes a sealing system 18, especially produced in the form of a flexible strip 19 which can be retracted into a cavity 20 in the underframe by any known system (hydraulic or pneumatic rams), guaranteeing sealing of the space lying between the floor of the vehicle 21 and the said underframe 22.

Heating means 23, particularly convection-type or radiation-type, used alone or in combination, and especially produced in the form of at least one arm equipped at one of its ends with a variable-frequency electromagnetic wave emitter, but preferably an infra-red wave emitter or with heating resistive elements placed in the air ducting, are also formed in the cell 1 or in the ventilation ducts. This method of heating ensures that the conditions under which the various paints are applied are respected, and most importantly, ensures that the drying time at given temperature and given relative humidity is respected.

The invention, as has just been described, allows all of the work for repairing bodywork on a vehicle to be undertaken without having to move the said vehicle and above all without being obliged to use a conventional spray booth.

Thus, the use of a small elevator platform would guaranty the work of removing, straightening, refitting at person height, thus increasing the efficiency of the operators. During the phase in which the elevator is being used, the arrays of fans 12, 16 are not switched on, whereas in the painting phase, the sealing device 4, 18 and the ventilation which are actuated make it possible to respect optimum working conditions, the solvents and solid particles being trapped in the various filter components 9, 11.

In the drying phase, all or some of the various heating means are used, whilst keeping the various arrays of fans switched on if need be.

This modular cell guarantees that the user has the shortest possible intervention times, for a reasonable energy cost, and allows him to increase his capacity to provide service to a mainly town-based customer base.

It remains clearly understood that the present invention is not limited to the embodiments described and represented hereinabove, but that it encompasses all variants thereof.

I claim:

1. A vehicle repair cell comprising:

modular panels interconnected to form an enclosure of the cell having a relatively short length so that only a section of a vehicle to be repaired may be enclosed within the cell, said cell having an open end;

a first inflatable sealing member, having a generally U-shaped configuration for framing said open end of the enclosure which admits a vehicle, a vehicle resting in the open end during repair;

first means liar vertically moving the inflatable sealing member between a first retracted open position for receiving a vehicle, and a second lower position for contacting and sealing the vehicle body relative to the open end;

a second sealing member normally retracted within a lower recess of the cell;

second means for vertically moving the second sealing member between a first retracted position for receiving a vehicle, without obstruction, and a second raised position for contacting and sealing the vehicle, below its undercarriage, relative to the open end;

the first and second sealing members thereby creating a seal between the periphery of the vehicle and the open end.

2. The cell according to claim 1 further comprising solid particle air filter means located at ground level of the enclosure.

3. The cell according to claim 1 further comprising means for ventilating the cell through the filter means with an adjustable flow rate.

4. The cell according to claim 1 further comprising means for elevating a vehicle within the cell for expediting repair work thereon.

5. The cell according to claim 1 wherein the second sealing member is a flexible panel mounted to the second vertical moving member.

6. The cell according to claim 3 further comprising heating means located in the ventilating means for drying paint applied to the vehicle.

* * * * *